United States Patent [19]

Romano

[11] Patent Number: 4,856,365

[45] Date of Patent: Aug. 15, 1989

[54] DEVICE TO ANCHOR A CYCLIST'S SHOE TO THE PEDAL OF A SPORTS OR COMPETITION BICYCLE

[75] Inventor: Antonio Romano, Padova, Italy

[73] Assignee: Campagnolo S.P.A., Vicenza, Italy

[21] Appl. No.: 70,114

[22] Filed: Jul. 6, 1987

[30] Foreign Application Priority Data

Jul. 8, 1986 [IT] Italy ................................ 21065 A/86

[51] Int. Cl.[4] .............................................. G05G 1/14
[52] U.S. Cl. ..................................... 74/594.6; 280/294
[58] Field of Search .............. 280/289 R, 289 E, 291, 280/294; 74/560, 594.4, 594.6

[56] References Cited

U.S. PATENT DOCUMENTS

| 4,395,055 | 7/1983 | Spademan ........................... 280/624 |
| 4,538,480 | 9/1985 | Trindle ................................ 74/594.6 |
| 4,686,867 | 8/1987 | Bernard et al. .................... 74/594.6 |

FOREIGN PATENT DOCUMENTS

| 0094276 | 11/1983 | European Pat. Off. . |
| 98329 | 1/1984 | European Pat. Off. .............. 74/560 |
| 58438 | 4/1984 | European Pat. Off. . |
| 0146218 | 6/1985 | European Pat. Off. . |
| 0146454 | 6/1985 | European Pat. Off. . |
| 2132753 | 1/1973 | Fed. Rep. of Germany ........ 74/560 |
| 3149345 | 6/1983 | Fed. Rep. of Germany ..... 74/594.6 |
| 2192525 | 2/1974 | France . |
| 7514835 | 12/1976 | France . |
| 2432427 | 4/1980 | France ............................... 74/594.6 |
| 8220709 | 6/1983 | France . |

Primary Examiner—Charles A. Marmor
Assistant Examiner—Eric Culbreth
Attorney, Agent, or Firm—Young & Thompson

[57] ABSTRACT

A device to anchor a cyclist's shoe to the pedal of a bicycle is provided, including a plate fixed to the bottom of a cyclist's shoe. The plate has front and rear engageable portions. A bicycle pedal is rotatable about a spindle; and a clip member cooperatively engages the front portion of the plate and a pivotable hook lever to cooperatively engage the rear portion of the plate. The clip member is laterally pivotable about an axis perpendicular to the foot rest surface. Portions of the hook lever and the spindle are adapted to cooperatively engage each other in a manner which prevents the pedal from rotating when the hook lever is not in engagement with the plate.

5 Claims, 6 Drawing Sheets

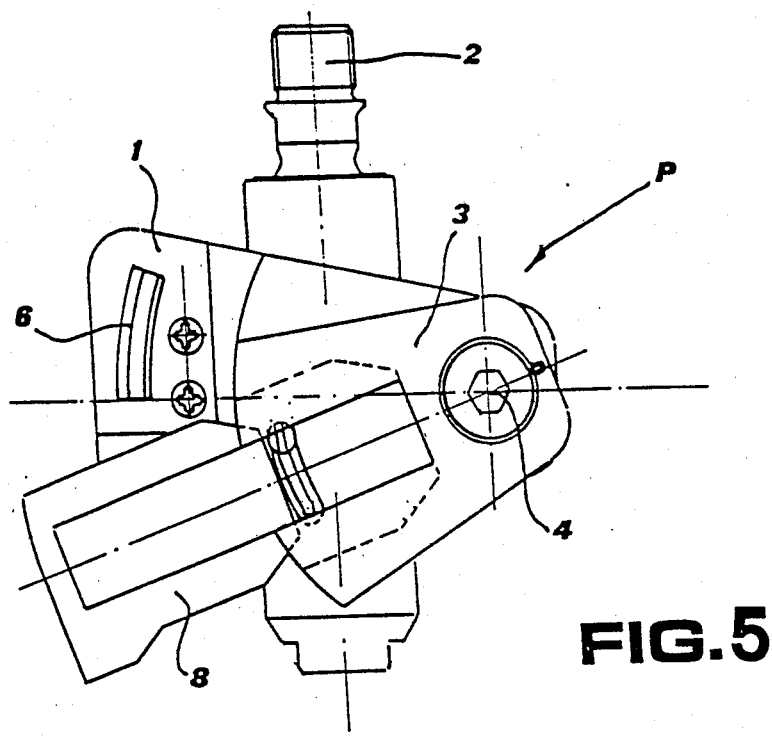
FIG.5
FIG.6
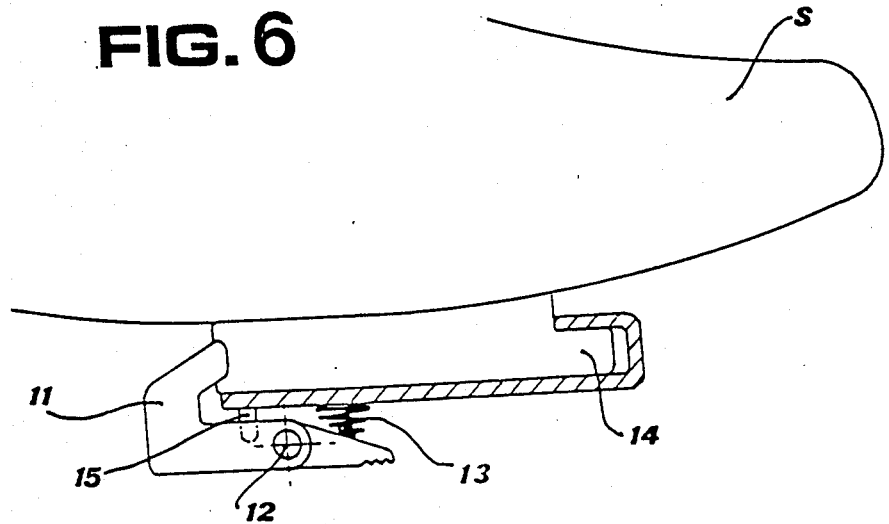

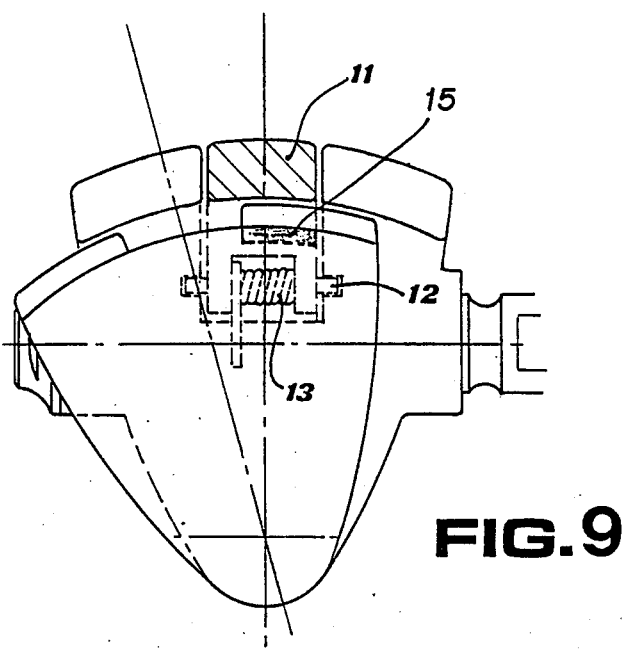
FIG. 9
FIG. 10
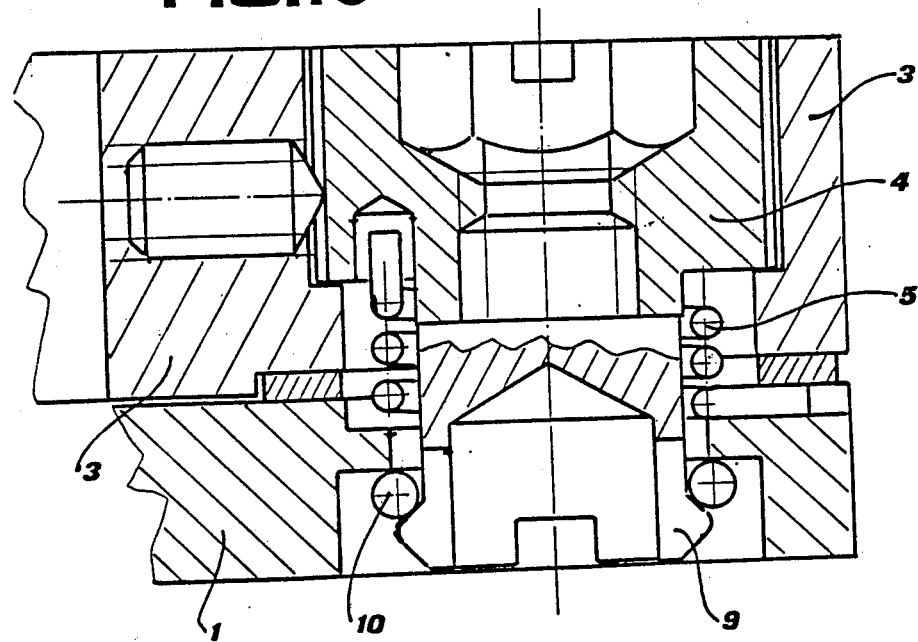

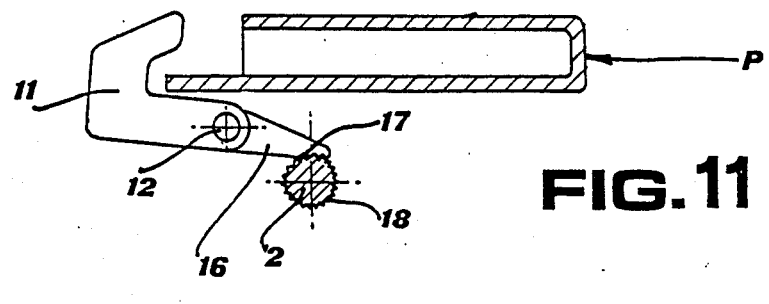
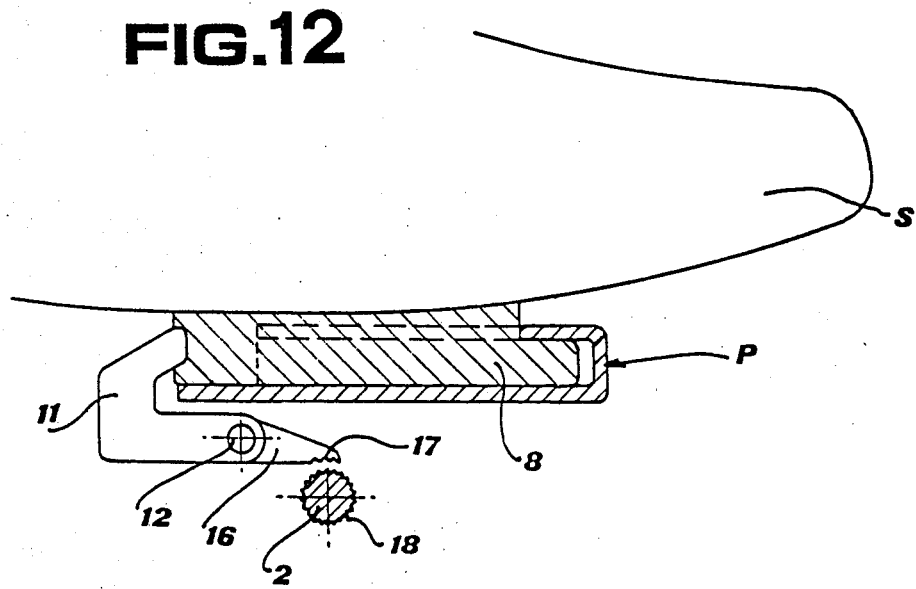

DEVICE TO ANCHOR A CYCLIST'S SHOE TO THE PEDAL OF A SPORTS OR COMPETITION BICYCLE

BACKGROUND OF THE INVENTION

The present invention concerns a device to anchor a cyclist's shoe to the pedal of a bicycle, especially a sports or competition bicycle, by means of a plate of stiff and strong material, suitably shaped and fixed to the sole.

Devices of this type, using different anchorage and release means, are well known in technique.

With some of said devices, both the anchorage of the cyclist's shoe to the bicycle pedal and its release therefrom, are obtained by a translation of the foot in the bicycle longitudinal direction (EP 0094276 and FR 7514835); with others, said anchorage and release are obtained by rotating the foot sideways in respect of its normal position (FR 2432427, EP 0146218, FR 2192525 and EP 0015803); with others still, the anchorage takes place by a translation of the foot in a direction perpendicular to the pedal rest surface, and the release is obtained by means of a lateral rotation of the foot (EP 0058438, EP 0146454 and FR 82.20709).

None of the devices of known technique have however proved to be fully satisfactory, either because of their scarce reliability and efficiency, or because of their complicated construction and use, and/or because they compelled the cyclist to perform movements and co-ordinated actions which are not sufficiently natural and instinctive. The proof of this is that the widespread use of such known devices by professionals and amateurs is taking long to gain ground, in spite of the attention which it undoubtedly arouses in the interested spheres and the considerable advantages which it would allow.

The present invention therefore proposes to improve the anchorage devices of known technique, so as to prevent their drawbacks and introduce further important advantages to fully satisfy the requirements of the users.

SUMMARY OF THE INVENTION

This is accomplished through a device wherein—in a fully original way—the anchorage is obtained by a translation of the foot in the longitudinal direction of the bicycle, while the release is obtained by an outward rotation of the foot, thereby following the most instinctive and natural, and thus easy and safe movements, which the cyclist is normally used to performing when getting on and off the bicycle.

More precisely, the device according to the invention—of the type comprising a plate fixed to the sole of the cyclist's show and means for the removable retention of said plate associated to the pedal body—is characterized in that said means comprise, on the front part, a mobile clip apt to house said plate and limit its translation, said clip being pivoted to the pedal body on an axis normal to the foot rest surface and being apt to rotate against the action of an elastic member and, on the rear part, locking means associated to the pedal body and releasable against the action of a spring, said locking means cooperating with said plate to allow it to shift forward and prevent it from shifting backward.

Said rear locking means are positioned on the transversal central line of the pedal body and may comprise a clamp, movable according to an axis normal to the foot rest surface of the pedal body or, alternatively, a hook lever oscillating on a pin positioned below the pedal body and parallel to its spindle, said hook lever being apt to engage the rear part of the plate fixed to the sole of the cyclist's shoe and being controlled, externally to the hook, by the bottom of said plate and, on the inner side, by a lateral cam projecting from the lower part of said mobile clip.

The mobile clip comprising two substantially parallel guides, into which is inserted the front part of said plate for its anchorage.

In the event of the rear locking means comprising a clamp, this latter is arc-shaped and emerges from the foot rest surface of the pedal body under the action of a spring, against which it can be caused to return into said body. The rear part of said clamp has an inclined surface. Furthermore, the rear part of said plate has an arcuate shape complementary to that of the clamp.

It should be noted, moreover, that in the structure of the device according to the invention, said clamp can be made inoperative and said mobile clip can be stopped from rotating by simply adding linkages or the like.

BRIEF DESCRIPTION OF THE DRAWINGS

The structural and functional characteristics of the invention and its advantages compared to known technique are placed in evidence in the following detailed description of some possible embodiments thereof, illustrated by mere way of example on the accompanying drawings, in which:

FIG. 5 is a plan view of the pedal of FIG. 1, during release of the plate fixed to the shoe sole;

FIGS. 6 and 7 are, respectively, a lateral view and a plan view of a modified embodiment of the device according to the invention, as the shoe is being anchored;

FIGS. 8 and 9 are, respectively, a lateral view and a plan view of the embodiment shown in FIGS. 6 and 7, as the shoe is being released, FIG. 10 is a sectional view, on an enlarged scale, of a modified embodiment of the pedal of FIGS. 1 to 5; and finally, FIGS. 11 and 12 show means for positioning the pedal, associated to the device, respectively in a working and in a rest position.

DESCRIPTION OF THE PREFERRED EMBODIMENTS

Figure 1:
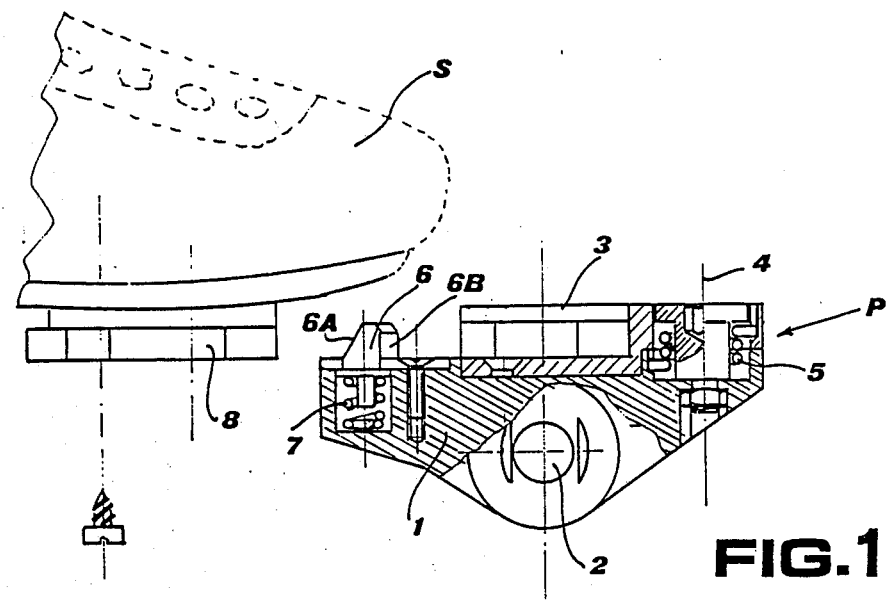
FIG. 1 is a partly sectioned front view of the pedal comprising the device according to the invention before anchorage of the cyclist's shoe (also shown)

As shown in the drawings, the device for anchoring the cyclist's show to the bicycle pedal provides for the body 1 of the pedal P—rotating about its own spindle 2—to carry on its central part a mobile clip 3, comprising two substantially parallel guides 3A and being rotatably pivoted on an axis 4, positioned in front and orthogonal to the pedal spindle 2, to which there is associated a spring member 5 opposing, with a progressive and adjustable action, the rotation of said mobile clip 3.

Figure 2:
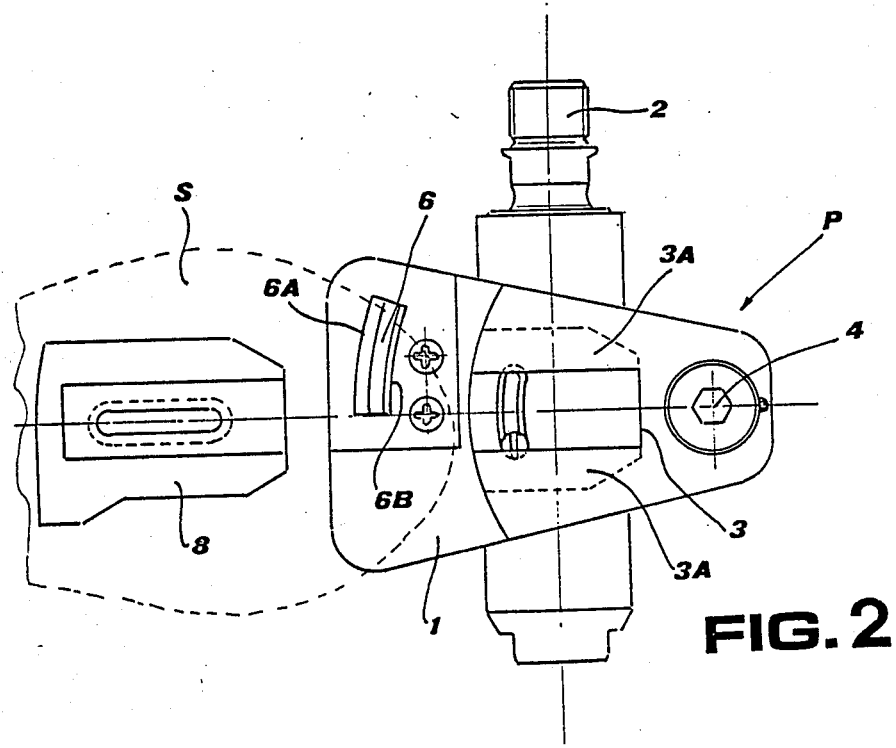
FIG. 2 is a plan view of the same pedal.
Figure 3:
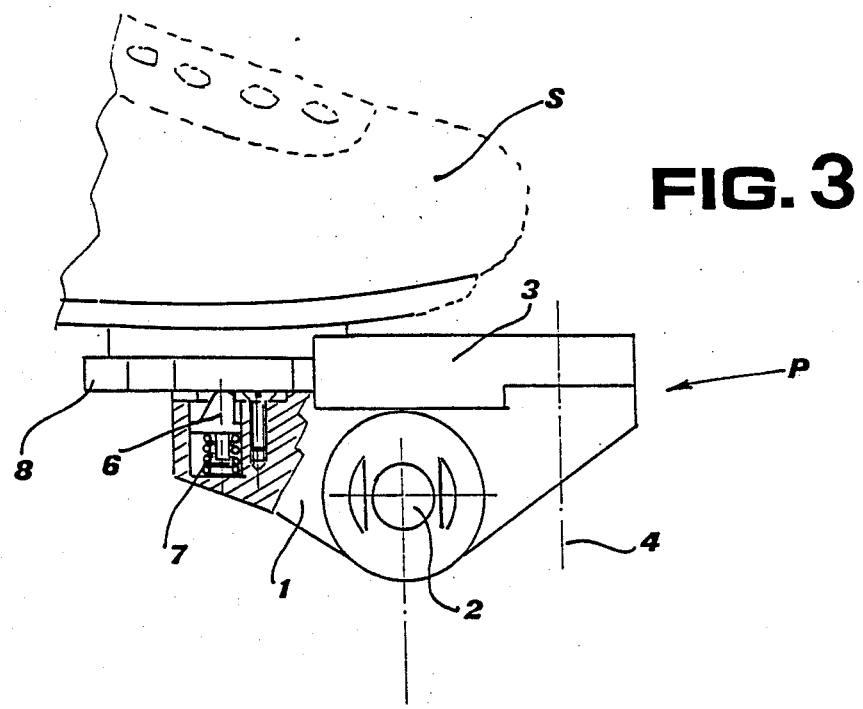
FIG. 3 is a view like that of FIG. 1, as the anchorage is taking place.
Figure 4:
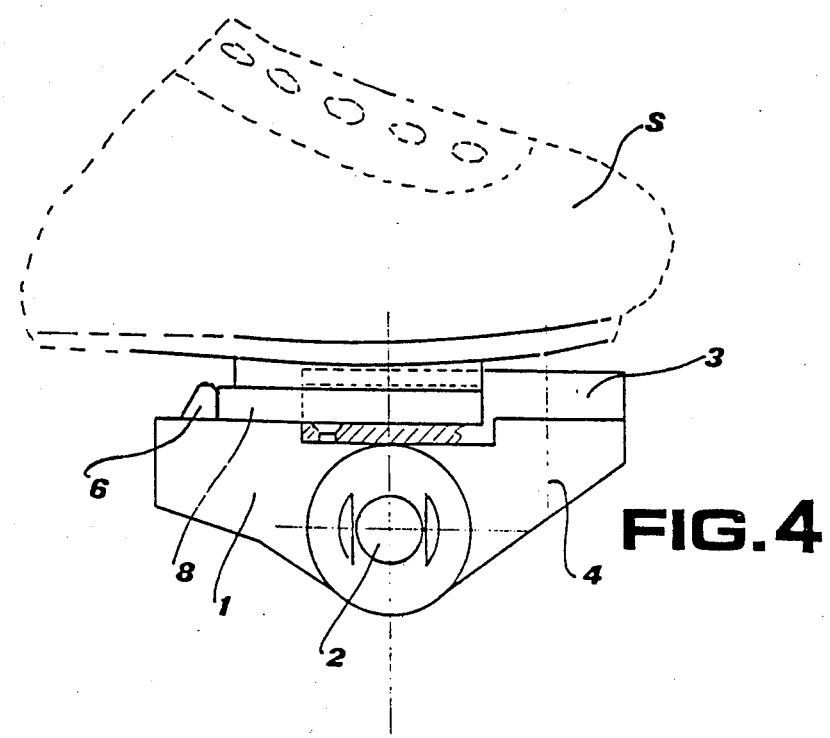
FIG. 4 shows the pedal of FIG. 1, with the shoe already anchored.

In the embodiment of the device shown in FIGS. 1 to 5, said anchorage device also comprises an arc-shaped rear clamp 6, emerging from the pedal body 1 along its transversal central line and apt to return in said body 1 against the action of a spring 7—if pressed on its inclined rear surface 6A, as well as directly from above——and the plate 8, fixed to the sole of the cyclist's shoe S, having its rear part arc-shaped like the clamp 6.

As the foot is moved forward to rest on the pedal body 1, by downwardly pressing the rear clamp 6, the plate 8 applied to the shoe S, on shifting forward, engages into the two substantially parallel guides 3A of the clip 3. Said engagement becomes stable when the plate 8 moves beyond the clamp 6 and this latter reemerges from the body 1, locking the plate itself into the guides 3A of the clip 3. Any backward shifting is now prevented by the vertical arc-shaped front part 6B of the clamp 6, against which rests the vertical arc-shaped rear part of the plate 8.

In order to release the shoe from the pedal, the cyclist must instead perform an outward rotation of the foot by an angle sufficient to remove the cooperation between the arc-shaped surfaces of the clamp 6 and of the plate 8; the concentric and complementary configuration of said surfaces is in fact apt to favour disengagement by rotating the plate 8 in respect of the clamp 6, said disengagement being obtained through rotation of the clip 3 against the action of the spring member 5.

Figure 7:
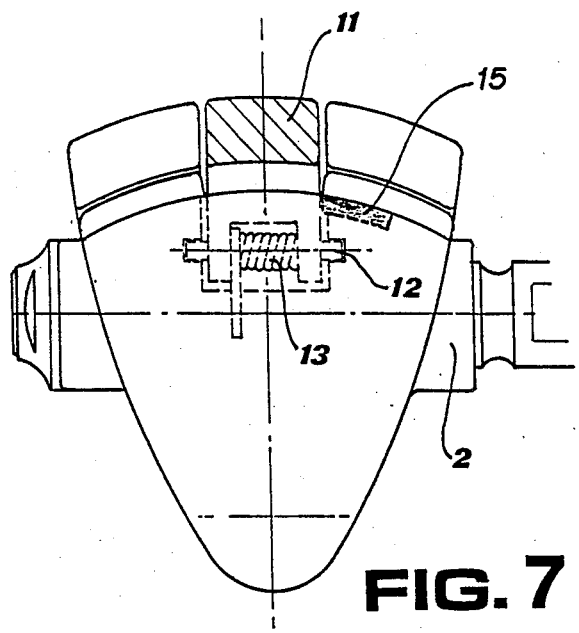
Figure 8:
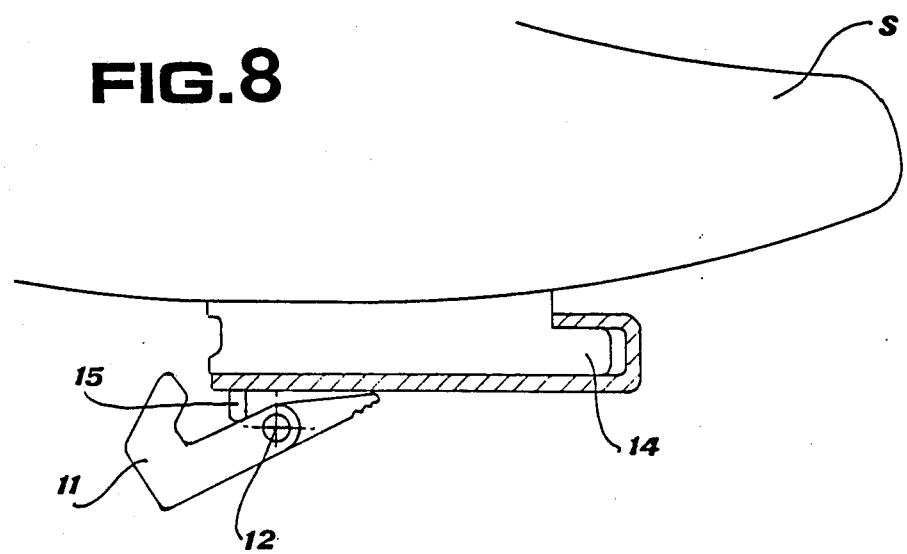

In the modified embodiment of the device, shown in FIGS. 6 to 9, the rear locking means consist of a hook lever 11, which is pivoted on a pin 12 positioned below the pedal body 1 (not shown) and parallel to its rotation spindle 2. The hook lever 11 is subject to the action of a return spring 13. Said lever can be caused to oscillate by the pressure imparted on the outer part of its hook 11 by the plate 14 fixed to the sole of the cyclist's shoe S—thereby obtaining the engagement of said plate 14 into the clip 3 of the anchorage device—or else by a lateral cam 15 projecting from the rear bottom part of said clip 3, when—by rotating the foot outwardly—said cam is caused to engage the inner part of said hook 11. Thanks to the action of the spring 13, the hook lever 11 engages with the rear part of said plate 14 in order to lock the same. In this embodiment, the position and profile of the cam 15 determine the rotation amplitude of the clip 3, required to release the cyclist's shoe S from the pedal.

The important advantage of the device according to the invention is that the disengagement of the shoe from the pedal requires a progressive action of foot release. In fact, in order to rotate the clip 3, the cyclist's foot has to impart a torque increasing with the rotation angle. Thus, for small rotation angles, the foot can move on the pedal body 1—without risking to disengage therefrom—with a certain freedom of movement, which has proved helpful and necessary to compensate the natural oscillations of leg articulation during racing. Whereas, for wider angles, the rotation must be operated with resolution and increasing force whereby, if having to release the shoe from the pedal, this operation can be done only by express wish of the cyclist.

Also the configuration of the plate 8 is advantageous, said plate being made in one piece with the shoe sole or being (by preference) suitably fixed thereto, and having no thickness variations and no notches or edges, so as to allow the cyclist to easily walk once he has got off the bicycle.

By providing simple linkages (not shown in the drawings), it is possible—in the device according to the invention—to block the clamp 6, so as not to stop the foot from shifting backward; likewise, it is possible to stop the rotation of the clip 3, so as to prevent the disengagement of the shoe from the pedal.

In the first case, one can still pedal, but with a less reliable shoe engagement. In fact, in these conditions, the shoe can be released from the pedal both by rotating the foot outwardly—as already foreseen—and by simply shifting it backward, while the main means applying a force to the pedal (downward pressure, forward thrust, upward pull) are still guaranteed.

In the second case, the non-rotation of the mobile clip 3 fully blocks the shoe to the pedal. In this condition, the foot can be released from the pedal only by manually operating the linkage which stops the rotation of the mobile clip 3.

It is possible, however, to provide also for a safety release—to be used in case of accidents—by introducing the structural modification shown on an enlarged scale in FIG. 10. Accordingly, in the embodiment of the anchorage device shown in FIGS. 1 to 5, the axis 4 of the clip 3 consists of a pin mounted on the pedal body 1 with the interposition of an elastic ring nut 9 locked by a ring 10.

In the event of a violent jerk, the mobile clip 3 disengages from the pedal body 1, together with the plate 8 and the shoe S, thanks to the fact that the elastic ring nut 9, on shrinking, and/or the ring 10, on expanding, allow the pin 4 to slip out of its seat.

To facilitate the operation of shoe engagement for the cyclist, it is possible to associate to the anchorage device according to the invention pedal positioning means, allowing pedals to take up a steady position—which is usually almost horizontal—when they are not engaged by the cyclist's shoe.

FIGS. 11 and 12 show said pedal positioning means applied to the hook lever 11 of the embodiment of the anchorage device shown in FIGS. 6 to 9. Such means comprise a knurl 17 formed on an extension 16 of the lever 11—oscillating, as known, on a pin 12 parallel to the pedal spindle 2—which is apt to cooperate with a knurled ring 18 formed on the pedal spindle 2, thereby opposing the rotation of said pedal on its spindle when the shoe is not anchored to the pedal itself (FIG. 11). Whereas, once the shoe is anchored to the pedal (FIG. 12), the oscillation performed by the lever 11 removes the engagement between the knurl 17 and the knurled ring 18, thereby allowing the free rotation of said pedal

What is claimed is:

1. A device to anchor a cyclist's shoe to the pedal of a bicycle, comprising
   a plate fixed to the bottom of a cyclist's shoe, said plate having front and rear portions;
   a bicycle pedal rotatable about a spindle;
   means for removably engaging said plate with a foot rest surface of said pedal, said means for removable engagement comprising clip means to cooperatively engage said front portion of said plate and locking means to cooperatively engage said rear portion of said plate;
   said clip means being laterally pivotable about an axis perpendicular to said foot rest surface;
   said locking means comprising a pivotable hook lever, one end of said hook lever adapted to engage said rear portion of said plate, and another end of said hook lever adapted to cooperatively engage said spindle in a manner which prevents said pedal from rotating when said hook lever is not in engagement with said plate, each said hook lever and said spindle including knurled surfaces which upon engagement prevent said pedal from rotating when said hook lever is not in engagement with said plate.

2. The device of claim 1 further including spring bias means to maintain said clip means in a rearwardly oriented position.

3. The device of claim 1 wherein said clip means includes substantially parallel guide elements which cooperatively engage mating surfaces on said plate.

4. The device of claim 1 wherein said clip means includes cam means adapted to engage said hook lever upon lateral rotation of said clip means and displace said hook lever from engagement with the rear portion of said plate.

5. A device to anchor a cyclist's shoe to the pedal of a bicycle, comprising
   - a plate fixed to the bottom of a cyclist's shoe, said plate having front and rear portions;
   - a bicycle pedal rotatable about a spindle;
   - means for removably engaging said plate with a foot rest surface of said pedal, said means for removable engagement comprising clip means to cooperatively engage said front portion of said plate and looking means to cooperatively engage said rear portion of said plate;
   - said plate means being laterally pivotable about an axis perpendicular to said foot rest surface;
   - said locking means comprising a pivotable hook lever, one end of said hook lever adapted to engage said rear portion of said plate, and another end of said hook lever adapted to cooperatively engage said spindle in a manner which prevents said pedal from rotating when said hook lever is not in engagement with said plate, said hook lever pivoting about a pin positioned below said foot rest surface of said pedal and positioned rearwardly of said spindle, and
   - spring bias means to maintain said hook lever in cooperative engagement with said spindle when said hook lever is not in engagement with said plate.

* * * * *